United States Patent
Wawsczyk et al.

(10) Patent No.: US 8,252,424 B2
(45) Date of Patent: *Aug. 28, 2012

(54) ARTICLE HAVING A MULTILAYER FILM OUTER SKIN INCLUDING AT LEAST ONE LAYER CONTAINING A PIGMENTED LAYER AND METHOD OF MAKING THE SAME

(75) Inventors: Christopher J. Wawsczyk, Mount Clemens, MI (US); Christian G. Mayville, St. Clair Shores, MI (US); Jeffrey S. Hutchison, Lake Orion, MI (US)

(73) Assignee: NJT Enterprises, LLC, Sterling Heights, MI (US)

( * ) Notice: Subject to any disclaimer, the term of this patent is extended or adjusted under 35 U.S.C. 154(b) by 1179 days.

This patent is subject to a terminal disclaimer.

(21) Appl. No.: 11/106,210

(22) Filed: Apr. 14, 2005
(Under 37 CFR 1.47)

(65) Prior Publication Data

US 2005/0287384 A1   Dec. 29, 2005

Related U.S. Application Data (60) Provisional application No. 60/562,172, filed on Apr. 14, 2004.

(51) Int. Cl.
*B32B 27/30* (2006.01)
(52) U.S. Cl. .................................. 428/520; 428/522
(58) Field of Classification Search ............. 264/173.12, 264/241; 428/520, 522
See application file for complete search history.

(56) References Cited

U.S. PATENT DOCUMENTS

| | | | |
|---|---|---|---|
| 4,746,220 A * | 5/1988 | Sukai et al. .................... | 366/79 |
| 5,003,001 A | 3/1991 | Hasenbein et al. | |
| 5,189,113 A | 2/1993 | Muehlenbernd et al. | |
| 5,631,328 A | 5/1997 | Wang et al. | |
| 6,340,550 B2 | 1/2002 | Hare et al. | |
| 6,403,005 B1 | 6/2002 | Mientus et al. | |
| 7,294,380 B2 | 11/2007 | Squier et al. | |
| 7,303,793 B2 | 12/2007 | Smillie | |
| 7,335,424 B2 | 2/2008 | Domine et al. | |
| 7,405,008 B2 | 7/2008 | Domine et al. | |
| 2002/0055006 A1* | 5/2002 | Vogel et al. ................... | 428/520 |
| 2002/0114951 A1 | 8/2002 | Horansky | |
| 2002/0114965 A1 | 8/2002 | Horansky | |
| 2005/0288418 A1 | 12/2005 | Mayville et al. | |
| 2005/0288419 A1 | 12/2005 | Mayville et al. | |

FOREIGN PATENT DOCUMENTS

EP    1 316 419 A2    6/2003

(Continued)

OTHER PUBLICATIONS

Anonymous: "DuPont SURLYN® Extrusion Guide" (Dec. 2003), Dupont De Nemours and Company Inc. Wilmington, Delaware, US, XP002335438 p. 1-p. 21, p. 9, left-hand column, last paragraph.

*Primary Examiner* — D. S. Nakarani
(74) *Attorney, Agent, or Firm* — Brooks Kushman P.C.

(57) ABSTRACT

A layered film having at least one layer containing particulate pigment in an extrudable thermoplastic material such as an ionomer, ionomeric precursor or the like, and a molded article containing the same. The layered film can be produced by an extrusion process and has a polymeric matrix essentially free of iron/ionomer complexes.

13 Claims, 2 Drawing Sheets

FOREIGN PATENT DOCUMENTS

| WO | WO 95/11929 | 5/1995 |
| WO | WO01/78981 A1 | 10/2001 |
| WO | WO 02/066249 A1 | 8/2002 |
| WO | WO 02/078953 a1 | 10/2002 |
| WO | WO2004/106050 A1 | 12/2004 |
| WO | WO2004/106057 A1 | 12/2004 |
| WO | WO2004/106058 A1 | 12/2004 |
| WO | WO2004/110752 A1 | 12/2004 |
| WO | WO2005/035243 A1 | 4/2005 |
| WO | WO2005/035244 A1 | 4/2005 |
| WO | WO2005/035246 A1 | 4/2005 |

* cited by examiner

× = CROSS-LINK POLYMER
+ = PPM IRON

*Figure 2B*

× = CROSS-LINK POLYMER
+ = PPM IRON

ARTICLE HAVING A MULTILAYER FILM OUTER SKIN INCLUDING AT LEAST ONE LAYER CONTAINING A PIGMENTED LAYER AND METHOD OF MAKING THE SAME

The present invention claims priority to U.S. Provisional Application Ser. No. 60/562,172 filed Apr. 14, 2004.

BACKGROUND

The present invention pertains to articles having an outer surface region composed of a multilayer polymeric film in which at least one layer is pigmented. More particularly, the present invention pertains to articles in which the multilayer film constituents include at least one ionomeric layer having as well as methods for making the same. Finally, the present invention also pertains to multilayer polymeric films having at least one pigmented ionomeric layer having an outer surface region essentially free from discoloration and discontinuity such as ambering and gel-induced imperfections.

The aesthetic value and desirability of various items can be enhanced if the items can be formulated in a variety of colors or hues. For instance, various native polymeric materials exist in shades of gray, or natural tans. To render these more pleasing, it has been contemplated that the materials can be pigmented with various shades. However, the finish of the polymeric articles can lack the sheen, luster, or beauty desired.

It has been proposed that the polymeric substrate be painted or overlaid by a suitable pigmented lacquer material applied in a spray, dip, or brush application process. However, such processes are labor intensive, may not impart the desired surface finish, and can present surface adhesive difficulties. Accordingly, it has been proposed that a pigmented polymeric film be integrated into overlying relationship with the desired surface or surfaces of a polymeric substrate. The polymeric film can be composed of one or more layers with at least one layer colored to the desired shade or hue. Such films can be integrated with the substrate article by various methods such as injection molding.

Heretofore, pigmented polymeric films have been successfully manufactured by casting processes. However, such processes are labor intensive and present difficulties when multilayer film constructs are desired. Extrusion methods have been proposed in the past. However, extrusion methods producing multilayer films suitable for use as a colored or pigmented outer layer have been problematic. Extruded films using materials such as ionomeric various materials such as ionomers in one or more of the multiple layers of the film construct have been difficult to produce successfully. The extruded films exhibit various imperfections that adversely affect the aesthetic appeal of the film when integrated on the article surface. These include, but are not limited to, phenomena such as gel formation and localized discoloration sometimes referred to as ambering.

Thus, it would be desirable to provide a multilayer film having at least one pigmented and/or metallic layer that can be integrated into or on a desired substrate article to produce a substantially uniform, aesthetically pleasing outer surface. It is also desirable to provide an article having an outer surface that has an aesthetically pleasing, uniform color characteristics. It would also be desirable to provide a method for producing a suitable polymeric film and an associated object or article incorporating the film.

SUMMARY

Disclosed herein is an article having a substrate and an outer surface composed of a polymeric film and a film suitable for use in the same. The polymeric film has at least one layer containing suitable pigment material dispersed therein. The polymeric film can include multiple layers such as an exteriorly oriented polymeric clear layer, a pigmented polymeric layer underlying the clear coat, a suitable backing layer composed of an appropriate polymer such as a polyolefin polymer associated with the pigmented ionomeric layer, and where desired or required, a suitable tie layer interposed between the backing layer and the pigmented polymeric layer.

The substrate is composed of a suitable melt-processible polymeric material capable of integral bonding with the backing layer of the pigmented polymeric film. The resulting article has a suitably colored surface that exhibits essentially uniform polymerization throughout the film and minimal defects such as discoloration or ambering and gel formation.

Also disclosed is a method for producing the article disclosed herein. The method includes formation of a polymeric film and integration of the film with a suitable substrate during substrate formation. The resulting article processes a colored surface that has minimal surface imperfections and defects.

DESCRIPTION OF THE DRAWING

The objects, features, and advantages of the disclosure herein will become more readily apparent from the following description, reference is being made to the following drawings in which.

DESCRIPTION

Disclosed herein is a polymeric film and article including the polymeric film having at least one pigmented polymeric layer. The pigmented polymeric layer includes an ionomeric compound or compounds integrated therein and a particulate pigment dispersed throughout. The film may have multiple additional layers including, but not limited to, unpigmented or clear layers, backing or reinforcement layers, tie or adhesion layers, and the like. Additionally, the polymeric film may optionally include multiple layers each containing different pigments to achieve appropriate color, hue, or visual characteristics in the finished material. It is also contemplated that various combinations of materials can be employed in a given layer to import the desired visual characteristics. The film and individual layers thereof are essentially free of perceptible visual defects caused by gel formation discoloration and/or ambering. The film disclosed herein is one suitable for incorporation into or onto the surface region of a suitable polymeric article.

Also disclosed herein is a method for preparing a polymeric film containing an ionomeric constituent and a suitable pigment or pigments dispersed therein. The polymeric film so prepared lacks ionic contaminants that function as gel formation foci. Also disclosed is a method for preparing an article having the aforementioned film on or associated with at least a portion of its outer surface.

Figure 1:
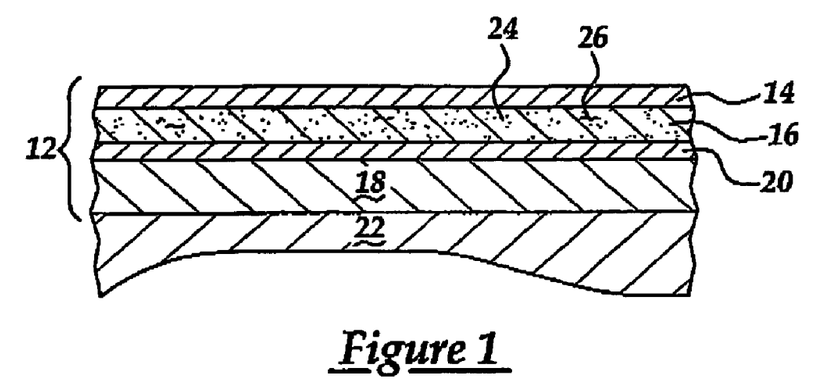
FIG. 1 is a sectional view through an article having a substrate and polymeric film material as disclosed herein.

As depicted in FIG. 1, the article 10 includes a suitable outer polymeric film 12 in overlying contact with a substrate 22. The article 10 can be any suitable moldable article or workpiece for any suitable end use application. Nonlimiting examples of such applications include automotive components such as bumpers, interior finish, fascia, and the like, as well as various non-automotive decorative and utilitarian articles. The polymeric film 12 has at least one pigmented layer that contains at least one ionomeric compound.

The polymeric film 12, disclosed herein, can be made using a suitable polymeric coextrusion or extrusion process. The polymeric film 12 can be composed of two or more coextruded layers typically including a polymeric layer 16 in overlying or underlying relationship with at least one additional polymeric layer or substrate. In the polymeric film 12 depicted in FIG. 1, polymeric layer 16 is composed of an extrudable thermoplastic material with a particulate pigment dispersed therein. The polymeric layer 16 has an outer clear layer in overlying relationship. Layers 14 and 16 are positioned in overlying relationship to a backing layer 18 and can be suitably adhered to the backing layer 18 by a suitable tie layer 20 where desired or required. Alternately, the backing layer 18 may be adhered directly to the layer 16. The various layers, 14, 16, 18, and 20 from a unitary coextruded film such as polymeric film 12.

As depicted in FIG. 1, the multilayer polymeric film 12 is adhered in overlying relationship to a suitable substrate 22. Substrate 22 is typically placed into essentially permanent contact with the film 12 through a suitable process such as injection molding and can be composed of any appropriate compatible material. Suitable materials used as substrate 22 include but are not limited to thermoplastic polyolefins and thermoplastic elastomers. The substrate 22 can be part of a suitable molded article of any configuration and end use. One non-limiting example of suitable articles contemplated herein are polymeric components of automotive vehicles such as bumpers, exterior facsia and the like.

As disclosed herein, the multilayer polymeric film 12 includes appropriate pigmentation and color augmentation present as particles 24 dispersed throughout at least one layer of the film 12. As depicted herein, particles 24 are dispersed through layer 16. Particles 24 are suitable granular solids capable of being integrated into the surrounding polymeric matrix. The multilayer film 12 may also include layers having suitable metallic particles 26 in dispersed relationship with a suitable polymeric matrix. The metallic material can have any suitable configuration or geometric shape as desired or required to enhance or pigment the resulting film 12. The metallic material as depicted is in the form of flakes. However, the metallic material can be in the form of spheres, nodules, or combinations of geometric configurations as configured to provide the desired visual effect. Where desired or required metallic particles or flakes 26 and particulate pigment 24 can be dispersed in the same layer. Various other visual enhancement additives may be employed as desired or required. These include, but are not limited to, opalescence enhancers and the like.

It is contemplated that the clear or optically transmissive layer 14 may be composed of any suitable clear polymeric material. Examples of suitable thermoplastic materials include, but need not be limited to, ionomers derived from sodium, lithium, or zinc, and ethylene/unsaturated carboxylic acid or anhydride copolymers. Suitable ionomer resins, but are not limited to, include those available from Dupont under the trade name SURLYN. These resins are identified as being derived from sodium, lithium, or zinc, and copolymers of ethylene and methacrylic acid. Included in this group are sodium-containing ionomers available under the SURLYN name and having the following designations: 1601, 1605, 1707, 1802, 1901, and the like. Also included are zinc-containing ionomers available under the SURLYN name having the following designations: 1650, 1652, 1702, 1705-1, 1855, and 1857. Lithium-containing ionomers available under the SURLYN name include the following designations: AD8546, 7930, and 7940.

As defined herein, the term "clear" as used with the clear layer 14 is defined as a material that can be seen through. The term "optically transmissive" as used herein is taken to mean transmissive to desired wavelengths of electromagnetic radiation such as in visible light. Generally transmissivities greater than 50 percent of visible light are contemplated with high transmisivities of greater than 90 percent being useful. The polymeric material of choice employed in the clear layer 14 can be one that imparts suitable scratch and abrasion resistance as desired or required. As such, it is contemplated that the clear layer can include suitable abrasion resistance enhancing additives as would be known to the skilled artisan. It is also contemplated that the clear layer can include additives which impart ultraviolet resistance and resistance to other undesirable environmental factors. Once again, such additives are typically known to the skilled artisan.

Where the clear layer contains materials as discussed previously, it is contemplated that concentrations of light stabilizers such as ultraviolet (UV) light absorbers and/or other light stabilizers can be employed. These additives are included to provide characteristics such as enhanced outdoor weatherability properties. The concentrations of light stabilizers in the clear layer can be in any suitable range. Exemplary ranges include about 1,000 to about 20,000 ppm based on the weight of the clear layer 14. Exemplary concentrations can, more specifically, include concentrations in the range of about 2,000 to about 20,000 ppm based on weight with more specific ranges varying from about 5,000 to about 20,000 ppm, or about 8,000 to about 18,000 ppm. Useful light stabilizers include the hindered amine light stabilizers. The hindered amine light stabilizers may, for example, be derivatives of 2,2,6,6-tetraalkyl piperidines or substituted piperizinediones. A number of hindered amine light stabilizers useful in the invention are available commercially such as from Ciba-Geigy Corporation under the general trade designations "Tinuvin" and "Chemissorb", and from Cytec under the general designation "Cyasorb-UV." Examples include Tinuvin 783 which is identified as a mixture of poly[[60[(1,1,3,3,-tetramethylbutyl)amino]-1,3,5-triazine-2,4-diyl][[2,2,6,6-tetramethyl-4-piperidyl)imino]hexamethylene[(2,2,6,6-tetramethyl-4-piperidyl)imino]] and dimethyl succinate polymer with 4-hydroxy-2,2,6,6-tetramethyl-1-piperidineethanol; Tinuvin 770 which is identified as bis-(2,2,6, 6-tetramethyl-4-piperidinyl)-sebacate; Tinuvin 765 which is identified as bis-(1,2,2,6,6-pentamethyl-4-piperidinyl)-sebacate; Tinuvin 622 which is a polyester of succinic acid and N-beta-hydroxy ethyl-2,2,6,6-tetramethyl-4-hydroxy-piperidine; and Chemissorb 944 which is poly[6-(1,1,3,3-tetramethylbutyl)amino]-s-triazine-2,4-diy[[2,2,6,6-tetramethyl-4-piperidyl)imino]hexamethylene (2,2,6,6-tetramethyl-4-piperidyl)imino]. A useful stabilizer is available under the trade name Ampacet 10561 which is a product of Ampacet identified as a UV stabilizer concentrate containing 20% by weight of a UV stabilizer and 80% by weight of a low density polyethylene carrier resin; the UV stabilizer in this product is Chemissorb 944. Useful light stabilizers are also provided in Ampacet 150380 and Ampacet 190303, both of which are pigment concentrates discussed above. Ampacet 150380 has a UV stabilizer concentration of 7.5% by weight. Ampacet 190303 has a UV stabilizer concentration of 4% by weight. The UV stabilizer in each of these products is Chemissorb 944. Ampacet LR-89933 is a gray concentrate having a UV stabilizer concentration of 4.5% by weight, the UV stabilizer being Tinuvin 783.

Where the clear layer contains additives as discussed previously, it is contemplated that concentrations of light stabilizers such as ultraviolet (UV) light absorbers and/or other light stabilizers can be employed. These additives are included to provide characteristics such as enhanced outdoor weatherability properties. The concentrations of light stabilizers in the clear layer can be in any suitable range. Exemplary ranges include about 1,000 to about 20,000 ppm based on the weight of the clear layer 14. Exemplary concentrations can, more specifically, include concentrations in the range of about 2,000 to about 20,000 ppm based on weight with more specific ranges varying from about 5,000 to about 20,000 ppm, or about 8,000 to about 18,000 ppm. Useful light stabilizers include the hindered amine light stabilizers. The hindered amine light stabilizers may, for example, be derivatives of 2,2,6,6-tetraalkyl piperidines or substituted piperizinediones. A number of hindered amine light stabilizers useful in the invention are available commercially such as from Ciba-Geigy Corporation under the general trade designations "Tinuvin" and "Chemissorb", and from Cytec under the general designation "Cyasorb-UV." Examples include Tinuvin 783 which is identified as a mixture of poly[[60[(1,1,3,3,-tetramethylbutyl)amino]-1,3,5-triazine-2,4-diyl][[2,2,6,6-tetramethyl-4-piperidyl)imino]hexamethylene[(2,2,6,6-tetramethyl-4-piperidyl)imino]] and dimethyl succinate polymer with 4-hydroxy-2,2,6,6-tetramethyl-1-piperidineethanol; Tinuvin 770 which is identified as bis-(2,2,6, 6-tetramethyl-4-piperidinyl)-sebacate; Tinuvin 765 which is identified as bis-(1,2,2,6,6-pentamethyl-4-piperidinyl)-sebacate; Tinuvin 622 which is a polyester of succinic acid and N-beta-hydroxy ethyl-2,2,6,6-tetramethyl-4-hydroxy-piperidine; and Chemissorb 944 which is poly[6-(1,1,3,3-tetramethylbutyl)amino]-s-triazine-2,4-diy[[2,2,6,6-tetramethyl-4-piperidyl)imino]hexamethylene (2,2,6,6-tetramethyl-4-piperidyl)imino]. A useful stabilizer is available under the trade name Ampacet 10561 which is a product of Ampacet identified as a UV stabilizer concentrate containing 20% by weight of a UV stabilizer and 80% by weight of a low density polyethylene carrier resin; the UV stabilizer in this product is Chemissorb 944. Useful light stabilizers are also provided in Ampacet 150380 and Ampacet 190303, both of which are pigment concentrates discussed above. Ampacet 150380 has a UV stabilizer concentration of 7.5% by weight. Ampacet 190303 has a UV stabilizer concentration of 4% by weight. The UV stabilizer in each of these products is Chemissorb 944. Ampacet LR-89933 is a gray concentrate having a UV stabilizer concentration of 4.5% by weight, the UV stabilizer being Tinuvin 783.

Various materials and compounds can be added to enhance scuff and abrasion resistance. Non-limiting examples of these materials include primary amides such as stearamide, behenamide, oleamide, erucamide, and the like; secondary amides such as stearyl erucamide, erucyl erucamide, oleyl palimitamide, stearyl stearamide, erucyl stearamide, and the like; ethylene bisamides such as N,N-ethylenebisstearamide, N,N-ethylenebisolamide and the like; and combinations of any two or more of the foregoing amides. Examples of suitable additive packages include those utilized as antislip additives. Non-limiting examples of such materials include additive packages available from Dow Chemical such as Elvax CE9619-1. This resin concentrate contains 20% by weight silica, 7% by weight of an amide slip additive, and 73% by weight of Elvax 3170 (a product of DuPont identified as an ethylene/vinyl acetate copolymer having a vinyl acetate content of 18% by weight). The additive can be used at a concentration in the range of up to about 5% by weight, and in one embodiment between 0.01% to and 0.5% by weight. The slip additive can be used at a concentration in the range of up to about 1% by weight, and in one embodiment between 0.01% and 0.5% by weight. The total amount of material employed will be an amount that is less than that which will adversely effect gloss characteristics for the clear layer. This will generally be amounts less that about 2000 ppm additive by weight of the clear layer, with levels below about 1500 being preferred.

As indicated previously, the multilayer polymeric film 12 includes at least one polymeric layer 16 containing solid particulate pigment and/or metallic particles. The polymeric layer 16 is typically positioned such that the outer clear layer 14 is in overlying relationship with the polymeric layer 16. As depicted in FIG. 1, the clear layer 14 can be in direct overlying relationship and contact with at least one polymeric layer 16. It is also contemplated that the multilayer polymeric film 12 can include multiple polymeric layers 16 as desired or required. The polymeric layer or layers 16 can include various pigmenting and opacifying agents that will provide the color, hue, and desired level of opacity for the multilayer film 12. The polymeric layer 16 is composed of a suitable melt processible and extrudable thermoplastic polymer or polymers.

The thermoplastic material employed in the pigment layer can be ionomers and ionomeric precursors such as those previously discussed with regard to the clear layer. Examples of suitable ionomers include alkylene-unsaturated carboxylic acid and anhydride copolymers neutralized with at least one of sodium, lithium, or zinc, such as neutralized ethylene-methacrylic acid copolymers.

It is contemplated that the polymeric material used in pigmented layer(s) 16 may also include minor amounts of various other polymeric compounds or materials. It is also contemplated that the polymeric material employed in the polymeric layers 16 can also include various additives such as UV stabilizers and the like, as desired or required. Nonlimiting examples of suitable additives are those listed previously in connection with clear layer 14.

The polymeric layer 16 can include various materials suitable for providing the appropriate color or hue characteristics as desired or required. Nonlimiting examples of suitable pigments include various metallic pigments, heavy metal-based pigments, heavy-metal free pigments, or various organic pigments. As used herein, a heavy metal pigment is defined as one including lead, cadmium, chromium, or antimony, or complexes derived therefrom. The pigments that can be successfully used include titanium dioxide, both rutile and anatase crystal structure. The titanium dioxide may be coated or uncoated. The pigment can be dispersed in the polymeric matrix in any suitable fashion which will provide the desired color or hue characteristics.

Examples of suitable materials include materials typically available as pigment concentrates that can be readily added to the ionomeric matrix during processing. The pigment concentrates are typically pigments present in resin carriers. Suitable resin carriers include various thermoplastic polymers having a melting point of in the range of about 100° C. to about 175° C. Examples of such materials include polyethylene, polypropylene, polybutylene, ionomeric materials and the like. The pigment material can be present in the concentrate such that the blend is between about 30 percent and about 70 percent by weight polymeric matrix, and about 70 percent to about 30 percent pigment material. An example of a commercially available pigment concentrate that can be suitably used is one available from A. Shulman, Inc. under the trade name Polybatch White P8555 SD. This material is identified as a white color concentrate having a coated rutile titanium dioxide concentration of 50 percent by weight in a polypropylene homopolymer carrier resin. Ampacet 150380 can also be used. This material is a product of Ampacet Corporation and is identified as a red pigment concentrate. Ampacet 190303 is also a produce to Ampacet Corporation, and identified as a black pigment concentrate. Ampacet LR-87132 Orange PE MB is also a product of Ampacet Corporation, and is identified as a lead molybdate/lead chromate pigment concentrate. Examples of heavy-metal free pigment concentrates that can be used include Ampacet LR-86813 Yellow UV PE MB, Ampacet LR-86810 Red PE MB, Ampacet LR-86816 Orange PE MB, and Ampacet LR-86789 red UV PE MB. It is contemplated that the concentrations of pigment in the resulting pigmented layer 16 can be up to about 25 percent by weight. Various embodiments can include between about 0.5 percent and about 25 percent by weight. It is contemplated that the pigment concentrate can be compounded with suitable polymeric carrier prior to compounding in the final film layer. Suitable carriers can be ionomer carriers.

As used herein, "ionomeric carrier" is taken to mean a polymeric material that can readily disperse into the ionomeric process stream during formation of pigmented layer 16. Suitable matrix materials include ionomers, ionomer precursors, and polymeric materials compatible with ionomers. Nonlimiting examples of ionomers include those previously enumerated with respect to the clear layer 14. "Ionomeric precursors" as that term is used herein is taken to mean homopolymers, acid co-polymers, monomeric compounds, and various constituents used to prepare ionomeric materials. "Ionomeric compatible materials", as that term is used herein, include polymeric materials that can be readily integrated or blended into an ionomeric process stream during a process such as extrusion or co-extrusion. Nonlimiting examples of such materials include various melt processible polyolefins having process temperatures up to about 600° F.

It is contemplated that the pigment or pigments employed will be ones that can provide appropriate light reflectivity characteristics as well as color consistency and repeatability from part to part and in each individual part depending on the angle of incidence from which the part is viewed. The pigment(s) of choice will be those that exhibit compatibility with ionomeric material in the melt extrusion process.

Without being bound to any theory, it is believed that at least a portion of the particulate pigment is integrated or associated into the ionic matrix during melt processing and extrusion thereby contributing to dispersion within the matrix and establishing a sufficiently random orientation to contribute to the visual color repeatability of the material.

In order to provide enhanced visual effects, the pigmented polymeric layer 16 can also include metallic particulate dispersed therein. The metallic particulate material can include at least one of aluminum, silver, tin, graphite, or the like. The metallic particulate can have any suitable form desirable to achieve the appropriate sparkle or other visual effect. Thus, the metallic particulate material can be present in the form of flakes, threads, geometric shapes, spheres, or the like. It is also contemplated that the metallic material can be present in a plurality of shapes to provide the appropriate or desired visual effect. The metallic particulate material can also include various metalized particulate substrates.

The metallic particulate material 26 will be of a size that disperses readily in the polymeric matrix while providing the desired light diffraction, reflectivity, and the like. The metallic particulate material 26 can be integrated into the pigmented polymeric layer 16 in the form of a concentrate containing the metallic particulate. The concentrate can contain, for example, 20 percent to 80 percent by weight additive material such as metallic particulate material, and about 20 percent to about 80 percent by weight polymeric carrier. It is contemplated that the concentrate can be a matrix containing both pigment material and metallic particulate. Alternately, it is contemplated that the metallic particulate material can be contained in a suitable concentrate independent of one or more of the pigment additives.

The polymeric film construct 12 further includes a suitable backing layer 18. The backing layer 18 can be composed of at least one thermoplastic polymer such as those discussed below. The backing layer 18 may be composed of a single thermoplastic polymer or a blend of thermoplastic polymers as desired or required. The backing layer 18 may also be composed of blends of various thermoplastic polymers and suitable adhesive materials. Additionally, the backing material in the backing layer may include other processing components and stabilizing components as desired or required.

As disclosed herein, the backing layer 18 can be composed of various melt-processible polymeric materials. Nonlimiting examples of suitable melt processible polymeric materials include various melt processible polyolefins. Other thermoplastic polymers having similar processing characteristics can be effectively employed as desired or required.

Polyolefins that are useful in the backing layer include, but are not limited to, polyethylene, polypropylene, polybutylene, as well as copolymers of ethylene, propylene or butylenes with various alphaolefins. The alphaolefins include those containing three to eighteen carbon atoms. Such materials include propylene, ethylene, butylenes, butene, hexane, 4-methyl pentene, octane, and the like. It is also contemplated that the polyolefin backing layer may be made of a blend of polyolefins such as polyethylene and various materials such as ethylene propylene copolymers. Medium density polyethylenes and linear medium density polyethylenes can be useful in the construction disclosed herein.

The material of choice will be one that can impart flexible strengthening characteristics to the thermoplastic film 12. Additionally, the material of choice in the backing layer 18 will be one that will exhibit appropriate adhesion characteristics with the material or materials employed in the substrate 22.

Where desired or required, the material employed in the backing layer 18 can include suitable compounds or additives to promote adhesion with the ionomeric layer 16 or any appropriate layers interposed there between. It is contemplated that such adhesion-promoting additives will be present as minor amounts of the composition and can include various ionomeric compounds as previously enumerated as well as compounds that exhibit an affinity to ionomeric materials. Nonlimiting examples of the latter include ionomeric precursors such as acid copolymers, homopolymers, monomers, and the like.

Where an adhesion promoting compound or material is incorporated into the material of the backing layer, it is contemplated that the incorporation may be homogeneous or non-homogeneous depending on the nature and characteristics of the respective materials. Where a minor portion of an ionomeric material is blended with the major polymeric material employed in the backing layer 18, it is contemplated that the material may be processed such that the respective materials orient upon extrusion to provide a region proximate to one film surface that is richer in ionomeric material. Without being bound to any theory, it is believed that the ionomeric-rich surface region promotes bonding between the backing layer 18 and associated ionomer layer such as pigment layer 16.

The backing layer can have any thickness desired or required to promote bonding to the underlying substrate. Where employed, the backing layer may also contribute to overall film stability during and after extrusion processing. A nonlimiting example of backing layer thickness would be thicknesses up to 0.5 inch. In certain applications thicknesses between 0.060 and 0.250 inch can be employed, with thicknesses between 0.060 and 0.180 being contemplated.

It is contemplated that the multilayer film 12 may include a tie or adhesion layer 20 as depicted in FIG. 1. The adhesion layer 20 is composed of at least one melt processible thermoplastic polymer or polymer blend that exhibits an affinity to the overlying pigmented ionomeric layer 16 and the backing layer 18 respectively. It is contemplated that the adhesion layer 20 includes a major portion of a suitable polyolefin. The adhesion or tie layer material also contains a minor portion of a second thermoplastic material that exhibits an affinity to the overlying ionomeric layer 16. In a preferred embodiment of the invention as disclosed herein, the second thermoplastic material includes at least one of an ethylene-unsaturated carboxylic acid or anhydride, such as ethylene/acrylic acid copolymers, or ethylene-methacrylic acid copolymers, ionomers derived from sodium, lithium, or zinc, and ethylene/unsaturated carboxylic acid or anhydride such as ethylene-methacrylic acid copolymer. It is also contemplated that combinations of two or more of the foregoing can be employed as the second thermoplastic material. The concentration of the second thermoplastic material is in a range between about 20 and about 49 percent by weight based on the weight of the tie layer 20. In one embodiment, the concentration of the second thermoplastic polymer is between about 45 percent by weight based on the weight of the tie layer 20.

Nonlimiting examples of polyolefins that can be used in the tie or adhesion layer 20 can include materials such as polyethylene, polypropylene, or polybutylene, as well as copolymers of ethylene, propylene, or butylenes with an alphaolefin. The alphaolefin can be selected from those alphaolefins containing from 3 to about 18 carbon atoms, including propylene, ethylene, butylenes, butene, hexane, 4-methylpentene, and octane. The polyolefin backing layer may be made by a blend of polyolefins such as polyethylene and ethylene propylene copolymers. Medium density polyethylene and the linear medium density polyethylenes are useful. A nonlimiting example of a useful polyolefin is a product available from A. Schulman, Inc. as FI 134, which is believed to be an anhydride in an olefin carrier.

As described above, the tie or adhesion layer 20 may include a second thermoplastic material selected from ethylene/unsaturated carboxylic acid or anhydride copolymers, ionomers derived from sodium, lithium, or zinc, and ethylene/unsaturated carboxylic acid or anhydride copolymers, as well as combinations of two or more thereof. Ionomeric resins available from Exxon Mobile under the designation XV 404, believed to be an ionomeric precursor, is a non-limiting example of suitable ionomeric materials.

As indicated previously, it is also contemplated that other suitable adhesive resins can be incorporated directly into the backing layer or interposed as part of a distinct layer between the backing layer 18 and ionomeric layer 16. Nonlimiting examples of suitable adhesive resins can include materials such as ethylene/vinyl acetate copolymers. Suitable ethylene/vinyl acetate copolymers are available from Dupont under the trade designation "Elvax". Examples include Elvax 3170 and 3190 LG. Adhesive resins available from Dupont under the trade name "Bynel" can also be used. These include ethylene/vinyl acetate resins available under trade designation Series 1100, acid-modified ethylene acrylic polymers (Series 2000), anhydride modified ethylene acrylic copolymers (Series 2100), anhydride-modified ethylene/vinylacetate copolymers (Series 3,000), acid-and-acrylate-modified ethylene/vinyl acetate resins (Series 3100), anhydride-modified ethylene/vinyl-acetate copolymers (series 3800), anhydride-modified ethylene/vinyl acetate resins (Series 3900), anhydride-modified high density polyethylene resins (Series 4,000), anhydride-modified linear low density polyethylene resins (Series 4100), anhydride-modified low density polyethylene resins (Series 4200), and anhydride-modified polypropylene resins (Series 5000). BYNEL CXA 1123 and BYNEL CXA 3101 are specific nonlimiting examples.

As indicated previously, it is contemplated that adhesive materials can be incorporated directly into the backing layer 18. When included in the backing layer, it is contemplated that the adhesive resin will be used at a concentration up to about 45%, or up to about 25 percent by weight. In one embodiment it is contemplated that the adhesive resin in the backing layer is an amount between about 1 percent and about 15 percent by weight. When used in the form of a distinct film layer between the backing layer and the ionomeric layer, it is contemplated that each of such adhesive resin films will have a thickness about 5 percent to about 25 percent of the thickness of the multilayer film 12, and in one embodiment a thickness between about 10 percent and about 20 percent. In a particular embodiment, for example, it is contemplated that the adhesive layer will have a thickness between 0.001 and 0.05 inch, with a range between 0.002 and 0.010 being contemplated and ranges between 0.002 and 0.004 being envisioned.

It is contemplated that colored articles 10 according to the embodiment(s) discussed herein include a suitable substrate 22 integrally attached to the backing layer 18. The substrate layer can be of any suitable thickness and configuration as dictated by the specifications and requirements of the finished article 10. The substrate 22 is composed of suitable injectable, melt-processible polymeric material(s). The material(s) of choice may exhibit thermoplastic or thermo setting characteristics. Nonlimiting examples of such materials are engineered polymers such as those characterized as thermoplastic elastomers (TPE). As used herein, the term "thermoplastic elastomer" refers to rubber-like materials that can be processed and recycled as thermoplastics. In particular, olefinic thermoplastic elastomers can be successfully employed. Such materials are commonly referred to as thermoplastic polyolefins (TPO). Olefinic thermoplastic elastomers can be materials having characteristics that allow the various components to soften and permit the polymeric matrix to flow at processing temperatures. When the material of choice cools, the hard segments solidify and re-establish a desirable rubber-like structure. Olefinic TPEs are typically multiphase material that includes crystalline or amorphous polyolefins such as polyethylene, polypropylene, and ethylene/propylene rubbers such as EPDM. Also included are materials such as polybutylene, polyisobutylene, polymethylpentene and the like. Materials of choice can have tensile strength in the range of 1,000 to 3,000 psi and melt temperatures in the range of 300° to 450° F.

Figure 3:
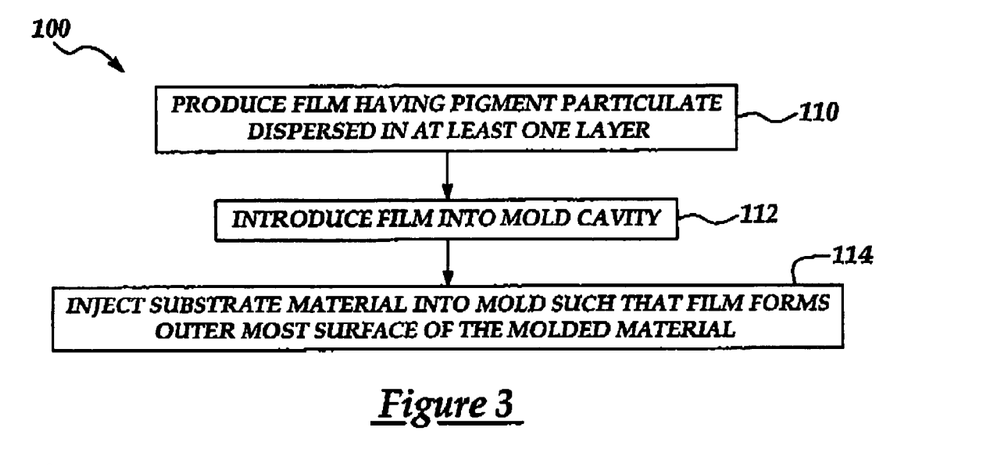
FIG. 3 is a process flow diagram outlining a general process of providing an article as disclosed herein.

In order to produce an article 10 having a multilayer film 12, it is contemplated that the article 10 can be produced by the method disclosed herein as outlined in FIG. 3. The method 100 involves the step of producing a film having pigment material dispersed in at least one layer as at reference numeral 110. The film can be produced by any suitable method. As disclosed herein, it is contemplated that the film is produced by a suitable co-extrusion process utilizing processing temperatures, mixing speeds, and flow rates, that effectively produce a film having at least two layers such that the particulate material is dispersed in at least one layer. It is contemplated that dispersion of the particulate pigment material is essentially uniform throughout the layer. As used herein, the term "essentially uniform" is taken to mean a dispersion of the particulate pigment material in a manner that exhibits minimal perceptible clumping or agglomeration of the particulate pigment.

Pigment dispersion occurs in a manner that minimizes the introduction or incorporation of volatilizable compounds into the polymeric matrix. Without being bound to any theory, it is believed that incorporation of volatilizable materials occurs due to the presence of additive aids associated with the pigment material. Reduction of such additives with the concomitant addition of pigment material in a suitable ionomeric compatible matrix permits successful integration of pigment into the polymeric matrix of the pigmented layer 16. As disclosed herein additive concentration is maintained at or below a suitable volatilization threshold.

Volatilizable additives include, but are not limited to, water, waxes, encapsulation components, and the like. As defined herein, the term "volatilization threshold" is the additive concentration level above which significant volatilization phenomena is experienced upon subsequent extrusion processing. "Volatilization phenomena" are any process or event whereby at least a portion of the additive is converted to a gaseous material and/or reacts to form at least one gaseous compound or material capable of migrating through the polymeric matrix while in its molten or semi-molten state either during film formation or subsequent molding operations.

Occurrence of volatilization phenomena can be characterized by surface imperfections either at the layer/layer boundary or at the outer film surface of the resulting article. Such imperfections can adversely affect the aesthetic or visual appearance of the finished article.

It has also been found unexpectedly that integration of milled pigment particles into a compatible concentrate that is then introduced into a process stream containing the polymeric matrix of polymeric layer 16 minimizes the occurrence and formation of gels and gel formation in the polymeric matrix material. As used herein, the germ "gel" is defined as localized regions of polymeric anomalies that mar the appearance and/or texture of the resulting film layer. Without being bound to any theory, it is believed that gels can be the result of a variety of reaction processes. Cross-link gels are the result of undesired crosslinking within the polymeric matrix and/or between the matrix and materials contained therein. The pressure of cross-link gels manifests as regions of optical inconsistency and/or discoloration in the film matrix. Cross-link gels can vary in size from single micron regions to areas over 200+ microns in size and greater. Such gels are difficult to remediate and provide a focus for thermal discoloration and surface irregularity.

Entanglement gels have the appearance of cross-link gels but exhibit greater thermoplastic behavior in that portions of the gel region can be reduced or eliminated by appropriate thermal processing. Without being bound to any theory, it is believed that entanglement gels are the result of concentrated regions unreacted acid copolymer that can be converted with application of thermal and/or mechanical energy into the ionomeric polymer. Entanglement gels can vary in size to over 200+ microns in size.

Unmelt gel regions are the result of polymeric material that has been inadequately processed and has failed to enter the melted state in a uniform manner. Size is similar to that of cross-link and/or entanglement gels. The size and severity of unmelt gels can be addressed by application of heat.

It is currently hypothesized that at least a portion of undesired gel formation in the multilayer film 12 is due, at least in part, to interaction between pigment material and the ionomeric constituent in the polymeric matrix. This results in gels having a significant cross-linked characterization. Without being bound to any theory, it is believed that careful integration of solid pigment particulate contained in a polymeric carrier that is readily integratable into the polymeric material employed in layer 16 reduces the occurrence of cross-link gel formation and minimizes the tendency of pigment particles to be the focus of gel formation.

The pigment carrier of choice will contain an ionomeric carrier and pigment together with a suitable compatibilizer present in an amount sufficient to disperse the pigment in the carrier and, ultimately, in the polymeric matrix of the polymeric layer 116. Suitable compatibilizers include acid copolymer ionomeric precursors in amounts between about 0.5% and 10% by concentrate weight.

It has also been discovered quite unexpectedly that a significant number of gel formations are focused on impurities introduced into the ionomeric matrix during film formation. Without being bound to any theory, it is believed that the ionomeric material and/or ionomeric precursors used in the various layers adhere to iron surfaces located in the extrusion device. Through continued use, the ionomeric/iron complex thus formed breaks off from the surface of the extrusion device and is introduced into the process stream where it initiates cross-linking and generates a polymeric region having thermosetting or quasi-thermosetting characteristics. It has been found that iron uptake or absorption into the polymeric matrix occurs at levels as low as a part per million.

In the resulting extruded film, the localized cross-linking creates cross-link gels that result in surface irregularities, discoloration or ambering due to thermal interaction, and/or perceived color shift due to anomalies in layer texture and/or thickness. As used herein, the term "ambering" is defined as discoloration events and associated regions having trace quantities of iron as the foci of the region. Regions that are classified as ambered be of any color but typically will be visible in shades of amber to brown.

Figure 2A:
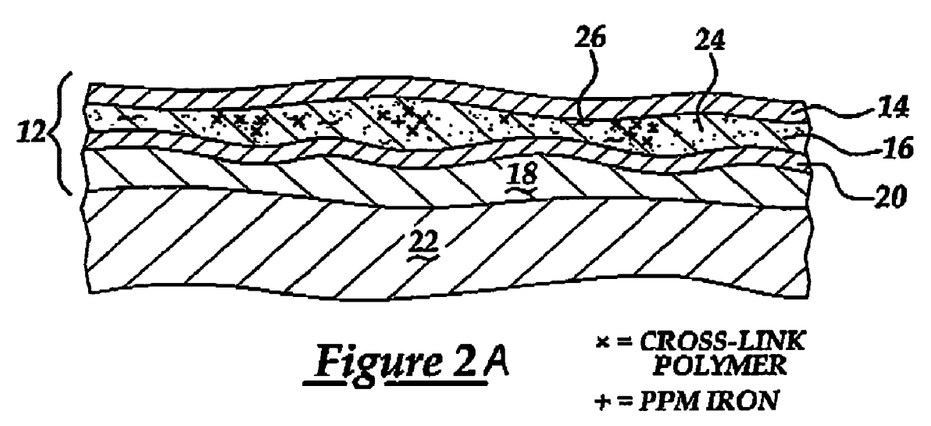
FIG. 2A is a cross-sectional view of an article having a film coating depicting defects such as gels and ambering as found in prior art methods.
Figure 2B:
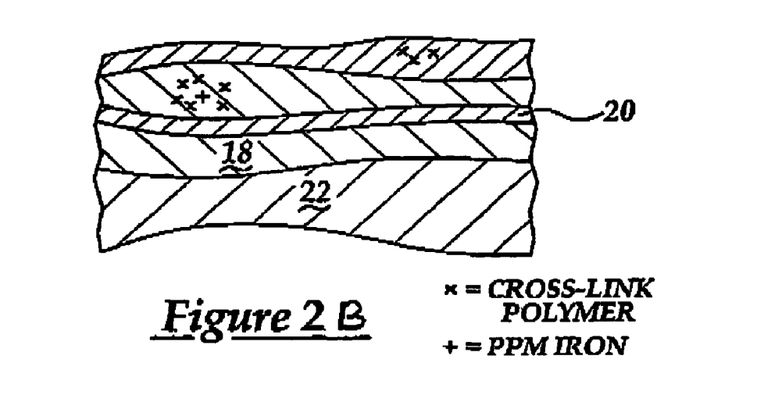
FIG. 2B is a cross-sectional view of an article having a film coating depicting defects such as gels and ambering as found in prior art methods demonstrating ambering in the clear layer.

The iron-induced gel imperfections generally range in size from $1\mu$ to about 400 µm, with gel regions in the range of 40 µm to 400 µm. The iron-induced gel imperfections can be perceived in either the clear layer 14 or the pigment layer 16. When colored, the gels can be amber to dark brown.

In order to reduce or eliminate iron-initiated gels, the polymeric materials that make up the various layers are processed in a manner that eliminates or minimizes contact with any iron surfaces. Thus ionomeric containing polymeric layers can be processed in an iron free environment. Thus all polymer contacting elements of the extrusion device such as the barrel and mixing screw are composed of a nonferrous metal or alloy. Nonlimiting examples of such metals include aluminum, titanium, and the like.

The produced polymeric film is introduced into a suitable mold cavity as at reference numeral 112. The mold cavity is formed in a suitable injection mold die. The polymeric film is introduced such that the film is positioned proximate to at least a portion of the mold cavity surface. Introduction of the film can be accomplished can be by any means. Thus, the film can be coextruded and directly introduced into the mold cavity. Alternately, the produced film material can be accumulated, cut to size, etc., prior to positioning relative to the mold cavity surface.

Once the film is introduced into the mold cavity, a substrate material can be introduced into the mold cavity as at reference numeral 114 such that the film forms the outermost surface of the molded material upon completion of the mold cycle. It is contemplated that the injection molding process can be any suitable process for introducing a polymeric material such as a thermoplastic polyolefin (TPO) into the desired mold cavity to form the article of choice. The injection process occurs such that the introduced film forms an outermost surface of the resulting article formed of the molded material. Thus, location of injection port and selection of flow rates, injection pressures and the like will be adjusted to facilitate interposition of the film material between the cavity surface and the introduced injectable material.

It is contemplated that processing temperatures will be such that the film material is bonded to the substrate material in an essentially permanent fashion upon completion of the mold cycle. As used herein, the term "essentially permanent" is taken to mean that the substrate and overlying film material are integrally connected to one another throughout the life of the associated part.

Figure 4:
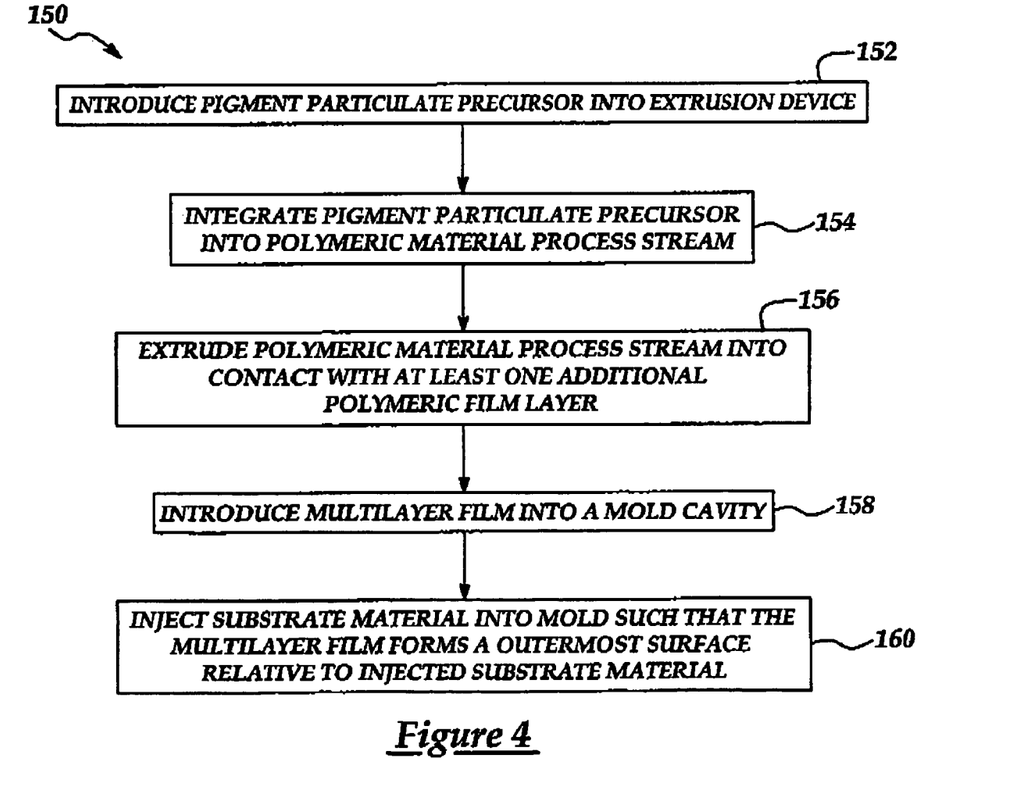
FIG. 4 is a process flow diagram outlining detailed process as disclosed herein.

In order to produce a molded article 10, a more detailed process such as that outlined in FIG. 4 can be employed. In order to produce the film layer 12 having at least one layer of pigment material, the metal particulate can be contained in a suitable pigment concentrate that can be introduced into an appropriate extrusion device as at reference numeral 152. It is contemplated that the pigment concentrate is a concentrate containing pigment material in a suitable polymeric matrix associated with a suitable encapsulating agent as discussed previously. The material can be introduced into an appropriate extrusion device by any suitable means such as batch feeding, continuous process, or the like.

The pigment concentrate can be integrated into a suitable polymeric processing stream as at reference numeral 154. Integration of the pigment concentrate can be accomplished by any suitable method. As disclosed herein, one such method that is contemplated includes the pre-melting of the pigment concentrate and incorporation into the polymeric material process stream in a manner that preserves the geometric configuration of a significant portion of the pigment material introduced therein. It is contemplated that a suitable blending screw or twin-screw blending device can be employed to integrate the material into the polymeric process stream.

The polymeric process stream can be composed of a suitable a melt processible polymeric material that contains a suitable ionomeric polymer. Where desired or required, the polymeric matrix of the pigment carrier concentrate can be any suitable polymeric compound or composition capable of integration into the polymeric process stream. It is contemplated that various ionomeric materials may be employed.

Once the desired pigment materials have been integrated into the polymeric material process stream, the resulting material can be extruded into a film into contact with at least one additional polymeric film layer. It is contemplated that the polymeric material process stream and the additional polymeric film layer material can be coextruded to provide a multilayer film construct. The additional polymeric film layer can be composed of any material appropriate for the multilayer film construct. Examples of such materials include suitable ionomeric materials or other materials appropriate for a clear coat, additional polymeric material process stream layers containing suitable pigmentation or the like, suitable backing layers, and/or tie or adhesive layers. It is also contemplated that multiple layers can be coextruded to provide the final multilayer film construct.

The resulting multilayer film construct can be removed from the extrusion device and processed in any post-extrusion processes which may be desired or required. It is contemplated that the material can be stored in any suitable fashion, cut, and processed as desired or required, or subject to further treatment process as necessary or required.

In the process as disclosed herein, and outlined in FIG. 4, the resulting multilayer film is introduced into a suitable mold cavity as at reference numeral 158. The mold cavity can have any configuration or geometry suitable for producing the resulting end-use article. It is contemplated that the mold cavity can be one that is used with a suitable injection molding process and/or various injection/transfer processes. The multilayer film introduced into the mold cavity is positioned proximate to the surface of the cavity so as to be interposed between the mold cavity surface and material introduced into the mold cavity during the processing operation. Positioning can be by any suitable means. The multilayer film material can be held in position by any appropriate means including, but not limited to, electrostatic force and the like.

Once the film is in position in the mold cavity, a suitable substrate material can be introduced into the mold such that the film forms an outermost surface integral with substrate material as at reference numeral 160. Suitable substrate materials include, but are not limited to, suitable melt-processible elastomeric compounds such as TPOs.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A multilayer film comprising:
   a clear coat layer comprising at least one extruded optically transmissive thermoplastic polymer; and
   a pigment layer comprising at least one extruded thermoplastic material and at least one particulate pigment interposed within the thermoplastic material, wherein the extruded thermoplastic is uniform in polymerization;
   wherein the clear coat layer and the pigment layer are essentially free of iron-induced imperfections including iron/ionomer complexes and are free of polymeric regions having trace quantities of iron as the foci of the regions and having thermosetting or quasi-thermosetting characteristics.

2. The multilayer film of claim 1, wherein the extruded optically transmissive thermoplastic polymer and the extruded thermoplastic of the pigment layer are selected from the group consisting of ionomers and ionomeric precursors.

3. The multilayer film of claim 1, wherein the particulate pigment is associated with at least one carrier material, the carrier material containing at least one extrudable thermoplastic is selected from the group consisting of ionomers, ionomeric precursors, ionomer compatible polymers and mixtures thereof.

4. The multilayer film of claim 1, wherein the clear coat layer and pigment layer each have a uniform thickness.

5. The multilayer film of claim 1 further comprising a backing layer, the backing layer in overlying relationship with the pigment layer at a location opposed to the clear coat layer.

6. The multilayer film of claim 5, wherein the backing layer contains an extrudable thermoplastic selected from the group consisting of melt-processible polyolefins.

7. The multilayer film of claim 5 further comprising at least one tie layer interposed between the backing layer and the pigment layer, the tie layer containing at least one extrudable thermoplastic exhibiting an affinity to the pigment layer.

8. The multilayer film of claim 7, wherein the tie layer further contains an extrudable thermoplastic exhibiting an affinity to the backing layer.

9. A polymeric article comprising:
a molded substrate; and
at least one polymeric layer overlying at least a portion of the substrate, the polymeric layer having a particulate pigment dispersed in an extruded thermoplastic material, the thermoplastic material characterized by uniform polymerization wherein the polymeric layer contains at least one extrudable melt-processible thermoplastic selected from the group consisting of ionomers, ionomeric precursors, and mixtures thereof and is essentially free of iron-induced imperfections including iron/ionomer complexes and is free of polymeric regions having trace quantities of iron as the foci of the regions and having thermosetting or quasi-thermosetting characteristics.

10. The polymeric article of claim 9 further comprising:
an optically transmissive layer in overlying relationship with the pigmented polymeric layer, the optically transmissive layer composed of an extrudable thermoplastic polymeric material selected from the group consisting of ionomers, ionomeric precursors, and mixtures thereof, where the layer is free of iron/ionomer complexes.

11. The polymeric article of claim 9 further comprising a backing layer, the backing layer interposed between the pigmented polymeric layer and the substrate.

12. The polymeric article of claim 11, wherein the backing layer is bonded to the molded substrate and wherein the backing layer contains a extrudable thermoplastic material selected from the group consisting of polyolefins, olefinic thermoplastic elastomers, and mixtures thereof.

13. The polymeric article of claim 12, wherein the polymeric film further compresses to the layer interposed between the backing layer and the pigment layer, the pigment layer containing at least one polymeric having adhesive affinity to the polymeric material in the pigment layer.

* * * * *